A. E. JERRAM & F. B. KEALL.
TACKING MECHANISM.
APPLICATION FILED JAN. 4, 1916.
1,268,357.
Patented June 4, 1918.
7 SHEETS—SHEET 4.
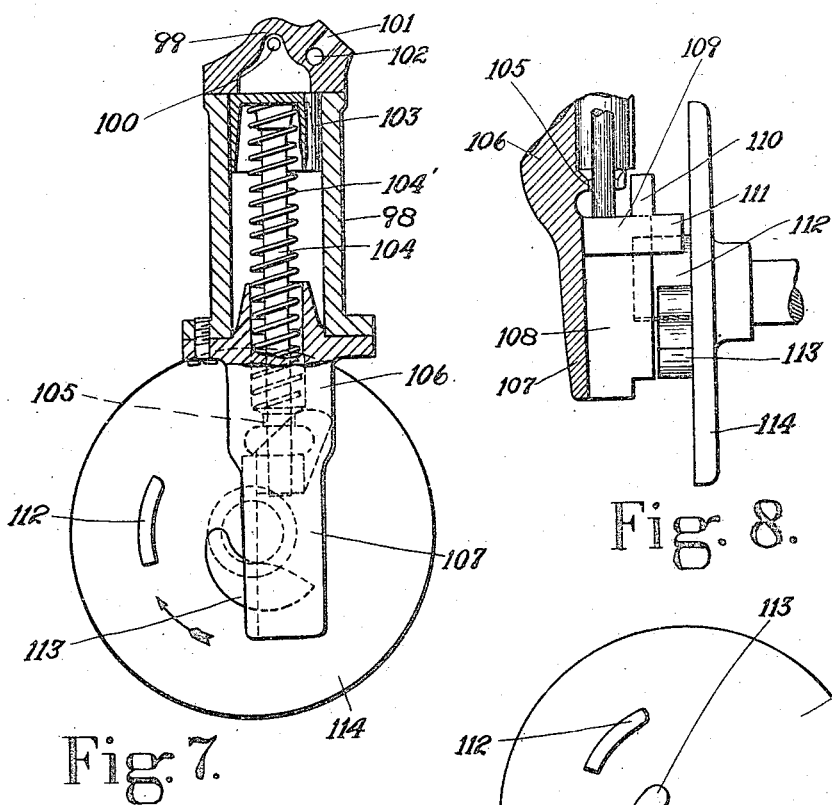
Fig. 7.
Fig. 8.
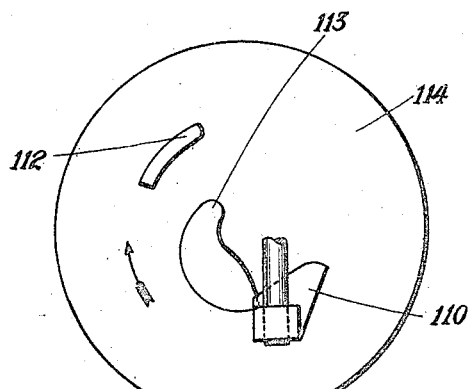
Fig. 10.
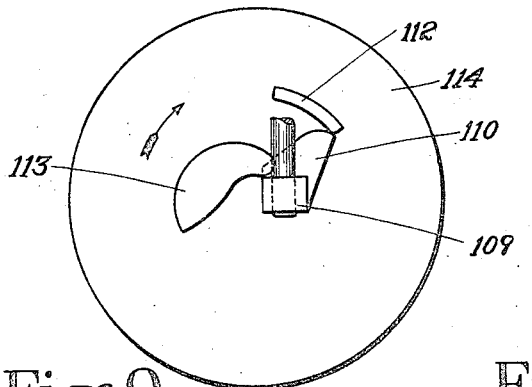
Fig. 9.
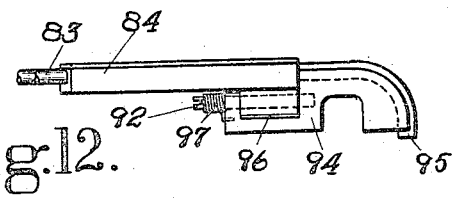
Fig. 12.
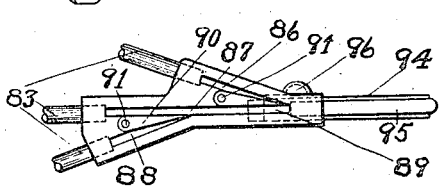
Fig. 11.
INVENTORS

A. E. JERRAM & F. B. KEALL.
TACKING MECHANISM.
APPLICATION FILED JAN. 4, 1916.

1,268,357.

Patented June 4, 1918.
7 SHEETS—SHEET 5.

INVENTORS
Arthur E. Jerram
Frank B. Keall
By their Attorney,
Nelson M. Atwood

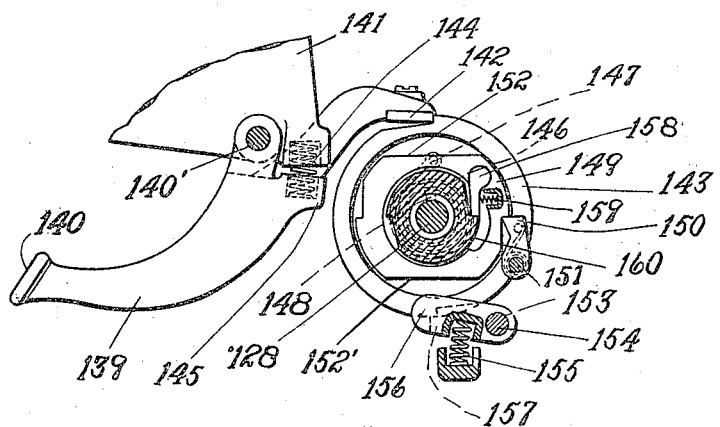

A. E. JERRAM & F. B. KEALL.
TACKING MECHANISM.
APPLICATION FILED JAN. 4, 1916.
1,268,357.
Patented June 4, 1918.
7 SHEETS—SHEET 7.
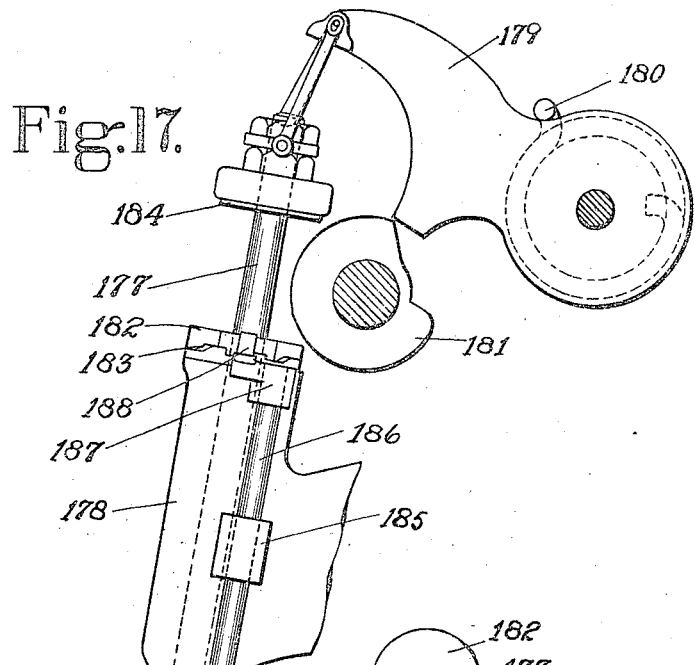
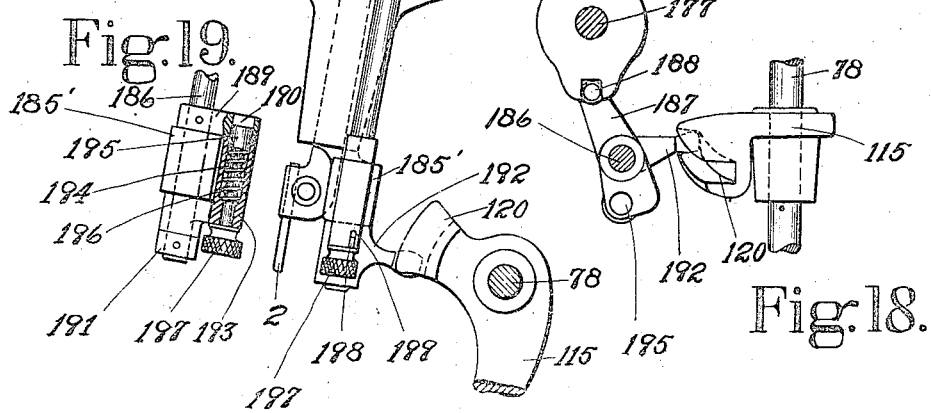

UNITED STATES PATENT OFFICE.

ARTHUR ERNEST JERRAM AND FRANK BYCROFT KEALL, OF LEICESTER, ENGLAND, ASSIGNORS, BY MESNE ASSIGNMENTS, TO UNITED SHOE MACHINERY CORPORATION, OF PATERSON, NEW JERSEY, A CORPORATION OF NEW JERSEY.

TACKING MECHANISM.

1,268,357.  Specification of Letters Patent.  Patented June 4, 1918.

Application filed January 4, 1916.  Serial No. 70,169.

*To all whom it may concern:*

Be it known that we, ARTHUR ERNEST JERRAM and FRANK BYCROFT KEALL, subjects of the King of England, residing at Leicester, Leicestershire, England, have invented certain Improvements in Tacking Mechanisms, of which the following description, in connection with the accompanying drawings, is a specification, like reference characters on the drawings indicating like parts in the several figures.

This invention relates to fastening inserting machines and particularly to machines of this class used to insert fastenings in boots and shoes. Inasmuch as this invention is of particular utility in machines of the general character disclosed in United States Patent No. 584,744, granted June 15, 1897, and known as hand method lasting machines, it will be herein disclosed as embodied in a machine of this type although it will, of course, be understood that the invention is not limited to machines of this character, In hand method lasting machines and other machines for inserting loose fastenings it has been customary to separate the individual fastenings from the bulk or supply of loose fastenings by means of a raceway and a suitable separator coöperating therewith. In order to permit as high a speed of operation of the machine as possible it has been usual, because of the short time available in each cycle for the separation of a fastening and the presentation of a fastening so separated to the driver, to place the extremity of the raceway and the associated separator as closely as possible to the fastening receiving orifice of the transferring block (in case one is used) or to the driver passage. This arrangement, while permitting high speeds, has disadvantages which are especially serious where the machine is intended to insert at will different kinds of fastenings and in which, accordingly, a plurality of supplying and separating devices are required. Among these disadvantages may be mentioned the necessity for using a separating mechanism of comparatively delicate construction, and accordingly subject to rapid wear and frequent derangement, and the restriction of free space in which to manipulate the shoe in presenting it to the driver or other tools that operate on the work.

It is an important object of this invention to overcome the disadvantages just described and to provide for the supply, separation and delivery of fastenings in machines of this general character in a way which will afford the necessary space in the neighborhood of the driver or other parts of the machine operating on the work and will permit the use of simple and reliable supplying, separating and deliverying devices while still giving the required speed. With this end in view it is proposed to locate the separating and supplying devices in a position relatively remote from the point at which the fastenings ultimately are to be delivered, and to utilize a blast of air in conveying the fastening from the separating mechanism to the point of delivery. Accordingly important features of this invention reside in the construction of the separating mechanism, in novel means for utilizing the air in the manner indicated, and in novel mechanism for producing a supply of compressed air.

In fastening inserting machines, and particularly in lasting machines of the hand method type, means sometimes is provided which can be adjusted to suspend the delivery of tacks or other fastenings used, to change the kind of fastenings delivered, or the number delivered in any cycle of operations of the machine, or to provide for effecting some combination of these functions. The present invention aims to provide means that will facilitate the securing of such changes in the supply of fastenings in machines of this general character.

Such machines usually are equipped with a single revolution clutch or some equivalent mechanism arranged to stop the operative elements of the machine in a predetermined position no mattter at what instant in the cycle of operations the starting and stopping mechanism is released. Heretofore such machines have always, so far as we are aware, been constructed and arranged to stop with the tack or other fastening already separated for insertion in the work during the next cycle of operations of the machine. Consequently such machines must perform one cycle of operations after the change in adjustment of the fastening supplying mechanism has been made before the desired change in the delivery of the fastenings is effected.

In order to overcome this objection a feature of the present invention consists in so timing the operations of the fastening supplying and driving mechanisms in relation to each other that the desired number and kind of fastenings are separated from the supply and driven into the work in one and the same cycle of operations of the machine.

The invention also is directed to the provision of means whereby the desired change in the supply of fastenings to the driving mechanism may be effected by the work. Machines of the class in question are usually provided with parts that operate on or bear against the work and which are rendered operative or inoperative at will or undergo some change in position or movement as the point of operation of the machine is transferred along the work. For instance, hand method lasting machines are usually provided with a bunter or edge gage which is brought into action when the heel and toe portions of the boot or shoe are being worked upon. It is proposed to utilize this characteristic of such machines in effecting the desired changes in the supply of fastenings; and the arrangement by which this object is accomplished constitutes an important feature of this invention.

The invention also contemplates the provision of mechanism by which the driver stroke can be varied either at will or automatically when the changes in tack supply are effected. In addition to the features of the invention above mentioned, the invention also consists in certain devices, combinations and arrangements of parts hereinafter described and claimed, the advantages of which will be readily understood by those skilled in this art from the following description.

The invention will now be described in detail as embodied in a hand method lasting machine of the type shown in the patent above designated.

In the accompanying drawings showing this embodiment:

Fig. 7 is a front elevation in part section of the pump and parts of its operative mechanism;

Fig. 8 is a side view partly in section of a portion of the mechanism shown in Fig. 7;

Figs. 9 and 10 are diagrams showing different positions of portions of the mechanism shown in Fig. 7;

Fig. 11 shows in plan certain details of Fig. 2, the cover plate being removed;

Fig. 12 is a view in front elevation of the details shown in Fig. 11;

Figure 13:
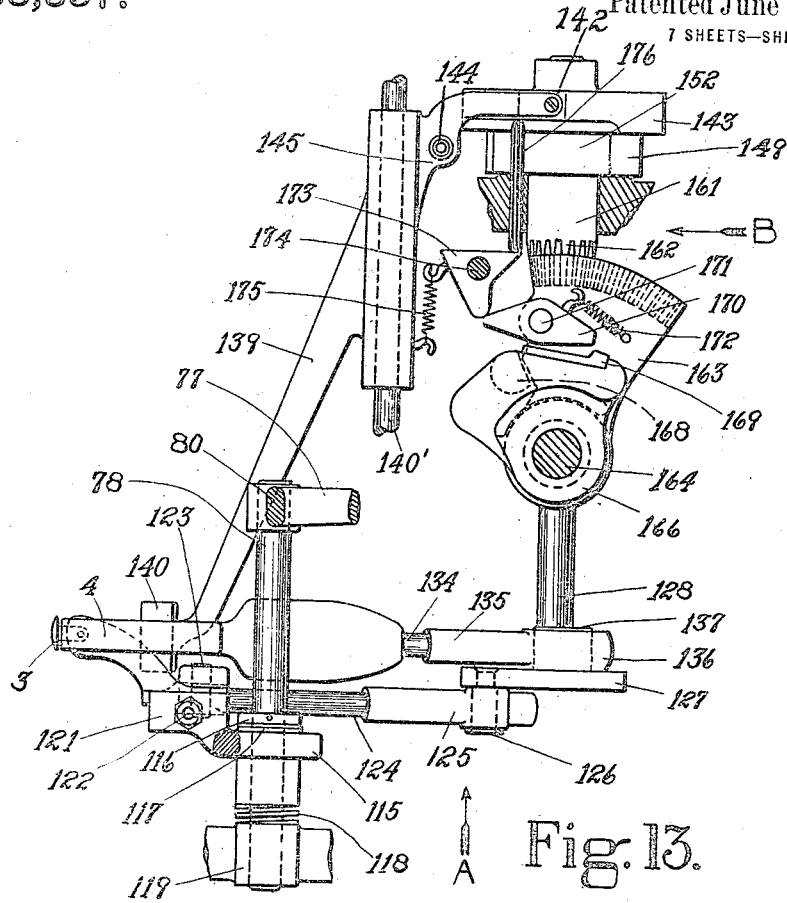
Figure 14:
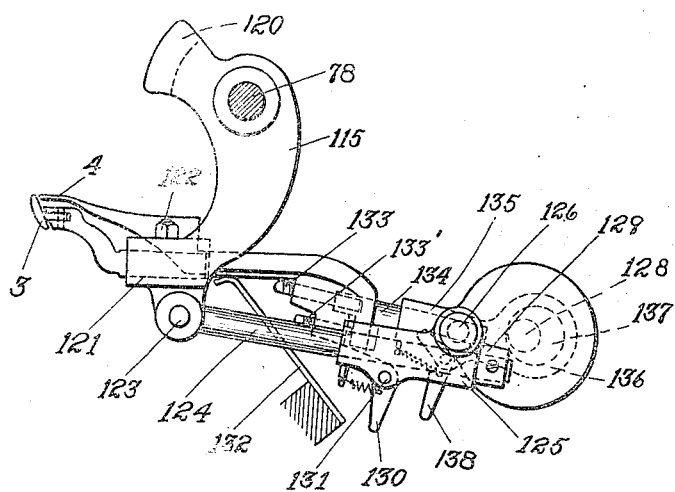

Figs. 13 to 16 show in detail the mechanism by which changes in tack delivery are effected in the present embodiment of the invention, Fig. 13 showing the mechanism mainly in plan, Fig. 14 certain parts thereof in side elevation looking in the direction of the arrow A in Fig. 13, Fig. 15 certain portions also in side elevation and partly in section and viewed in the same direction as Fig. 14, and Fig. 16 being a rear elevation, partly in section, of certain parts of the mechanism shown in Fig. 13 looking in the direction of the arrow B in Fig. 13;

Fig. 17 is a side elevation of the mechanism by which the driver stroke is altered concurrently with certain changes in tack supply;

Fig. 18 is a plan of certain of the parts shown in Fig. 17; and

Fig. 19 is a front elevation, partly in section, of a detail of the mechanism shown in Fig. 17.

Briefly stated, the machine shown comprises a tack pot having several compartments adapted to receive tacks of different kinds, a raceway leading from each tack compartment, a separator arranged at the delivery end of each raceway to control the delivery of tacks therefrom, mechanism arranged to utilize compressed air to convey the tacks from the separators to the driving mechanism, and a selecting mechanism that controls the separators or determines which separator shall be effective to supply tacks during each cycle of operations of the machine, this selecting mechanism thus being operative to determine the kind of tack that shall be delivered to the driving mechanism. This device and mechanisms all form parts of the means that supplies tacks to the mechanism that drives them into the work. The machine also includes mechanisms arranged to be controlled by the work to enable the work to operate the selecting mechanism and also to modify the driver stroke when the tack supply is changed. The detailed description of these several mechanisms will be taken up substantially in the order in which they have just been named.

Figure 1:
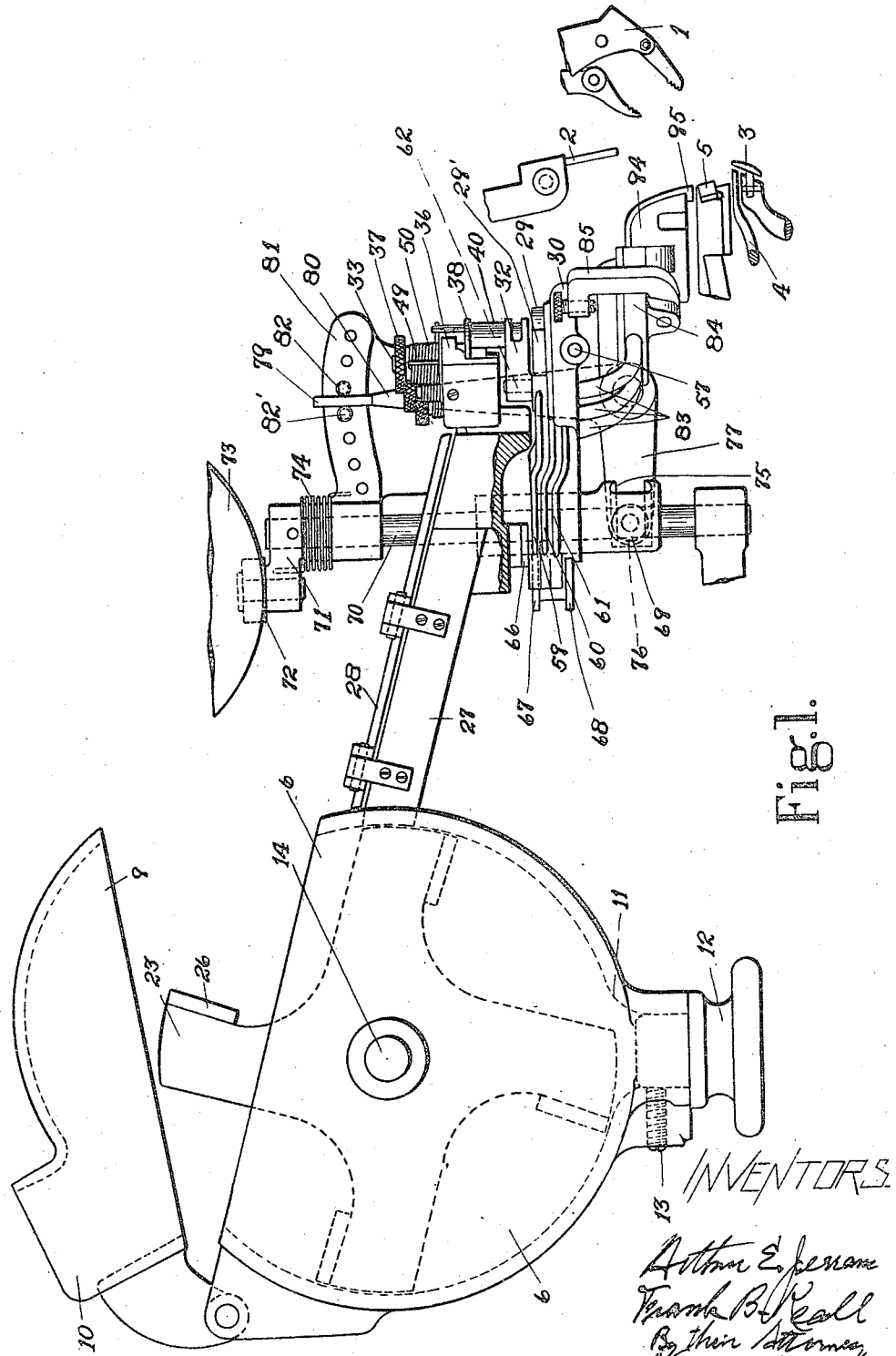
Figure 1 is a side elevation showing the parts of the machine with which this invention is more particularly concerned.

Referring now to the drawings, and particularly to Fig. 1, 1 indicates the pincers of the lasting machine; 2 the tack driver; 3 the bunter; 4 the feather gage; and 5 the tack transferring block, all of these parts being of a character common in hand method lasting machines.

The tack pot 6 is divided into three compartments by partitions 7 and 8 to receive different kinds of tacks (for example long and short McKay tacks and welt tacks) and is provided for purposes of inspection with a hinged cover 9, shown partially raised in Fig. 1. This cover is provided with a transversely raised portion, the end of which is seen at 10 (Fig. 1) and in which an opening is formed over each compartment of the tack pot to allow tacks to be poured into any particular compartment without raising the cover. In the bottom of each compartment is an emptying orifice 11 normally closed by a plug 12 held in place by a set screw 13.

A shaft 14 passes through the tack pot and is driven from the shaft 15 (which surrounds it at one end) through a friction connection comprising a flange 16 on the shaft 15, a flanged collar 17 pinned on to the shaft 14 and a leather or other collar 18 between the flange 16 and the flanged collar 17. In each compartment there is pinned upon the shaft 14 a collar 19 having a screw-threaded sleeve 20 integral therewith, and clamped between the collar 19 and a nut 21 threaded on the sleeve 20 are two plates 22 and 23 separated by a distance piece 24. The plates 22 and 23 have four arms (see Fig. 1) having at their ends inclined portions 25, 26, the portions 25 in the plates 22 being inclined to one side of the plane of the plate and the portions 26 on the plates 23 oppositely inclined so that they form scoops operative to raise tacks from the bulk or supply in the tack pot and permit such of the tacks as lie appropriately to swing on their heads until their points depend between the plates, their heads being supported by the parts 25 and 26. A raceway 27 of the usual kind and provided with a loose hinged cover 28 (Fig. 1) is disposed so as to be supplied with tacks from each scoop wheel formed by the plates 22 and 23.

A tack separator is placed at the lower or delivery end of each raceway 27. Referring particularly to Figs. 3 to 6 of the accompanying drawings, it will be evident that each separator comprises a block 29 (Fig. 4) rigidly supported on a bracket 30 (Fig. 2) projecting from the machine frame, and having an upright portion 31 that forms a bearing for the lower part of a movable separator block 32, the upper portion of which finds a bearing on a pin 33 projecting from the portion 31. The pin 33 also passes through lugs 34 and 35 projecting from a block 36 and the blocks 32 and 36 are held against endwise movement by the milled nut 37 threaded on the end of the pin 33.

The block 32 carries a separator plate 38 in which is formed a narrow inclined separating notch or slot 39 through which the individual tacks are forced as they are separated one at a time from the line of tacks in the raceway 27. This slot terminates in an aperture 39' of sufficient size to allow a tack to drop through it when the tack arrives at the end of the slot. A thin strip of metal 40 encircles part of the body of the block 32 and is cut away, as indicated at 41, Fig. 3, adjacent to the forward end of the slot 39, to constitute a gate of the type common in devices of this character. The separator plate is mounted to oscillate about the axis of the stud or pin 33 and as it swings forward, its point picks off the foremost tack in the raceway 27, pushing the tack into the open end of the separating notch or slot 39. Further forward movement of the plate 38 forces this tack through the slot 39 (its head in the meantime resting on the top of the plate 38) into the aperture 39'. During this movement a short slot 45 formed in a part of the block 36 that lies just above the plate 38 guides the head of the tack from the end of the raceway 27 into the upper end of a tack delivery duct or passage 43 that extends vertically through a part 42 of the block 36 (see Fig. 4). The aperture 39' comes into alinement with this duct when the separator block arrives at the end of its stroke. This duct is in alinement with a short opening 44 in the plate 29 and the latter opening leads to another duct 83 through which the tack is conveyed to the tack driving mechanism. In the present machine the tack is delivered to a tack block which positions the tack for the operation of the driver.

Mounted just above the slot 45 is a removable inspection plug 46 having a right angle passage 47 formed in it, which connects the upper end 45' of the duct 43 with an air duct or passage 48 that communicates with a similar passage 54 formed centrally in the pin 33. This passage 54 turns at right angles in the part 31 and extends in a radial direction to the periphery of said part where it terminates in a port. Another air duct 55, which is connected directly to the source of compressed air, is shaped similarly to the duct 54 but lies below the latter duct and terminates at its upper end in a port lying close beside the port forming the end of the duct 54. These two ports are normally closed by the block 32 but, as clearly shown in Fig. 4, they may be connected by a recess or cavity 56 formed in the inner or bearing surface of the block 32. This part of the separator block thus forms a valve that controls the flow of air through the ducts 55, 54, 48 and 47 to a point just behind the point in the duct 43 at which the tacks are delivered by the separator. The port 56 of course is narrow so that it permits the flow of air through these ducts only at that point in the movement or stroke of the separator block at which the separator plate has completed its delivery of a tack from the raceway to the duct 43. Each separator thus is constructed to control the discharge of air that serves to carry away the fastenings which it separates. The three separators are alike in construction so that it is necessary to describe only one of them.

The pump for supplying compressed air to the separators comprises a fixed cylinder 98 (Fig. 7), having a cylinder head 99 in which is formed an inlet passage 100 controlled by a suitable valve (not shown) and an outlet passage 101 provided with a valve 102. This passage 101 is connected by an appropriate length of pipe to the air ducts 55 of the separators. Within the cylinder is a piston 103 mounted on a piston rod 104 that passes through an opening 105 in a member 106 secured to the cylinder and having a bearing surface 107 and a guiding wall 108 for a block 109 that is secured to the lower end of the piston rod. This block has two surfaces 110 and 111 formed upon it adapted to coact, respectively, with two cams 112 and 113 on a disk 114 fixed on a driven shaft of the machine. A spring $104^1$ surrounds the piston rod bearing at one end on the member 106 and at the other end upon the piston. In operation the disk 114, moving in the direction of the arrow shown thereon in Fig. 7, causes the cam 112 first to engage the surface 110 on the block 109 and depress the piston rod, thus drawing air into the cylinder. After a certain amount of movement of the piston has been produced in this manner, its retraction is continued by the coaction of the cam 113 and the surface 111 which complete the intake stroke of the pump. When the cam 113 passes off the surface 111 the return or compression stroke of the piston is effected by the spring $104^1$. The compression movement of the piston is therefore independent of the speed of the machine and the impulse imparted to the tack consequently is in no way affected by changes in the speed at which the machine is driven. The cams 112, 113 and the corresponding surfaces 110, 111 are designed to secure the maintenance of a constant and small leverage on the piston rod throughout its intake stroke, which makes for ease and uniformity of turning effort, reducing the power consumed by the machine and facilitating hand turning of the machine when this is called for.

While a large variety of mechanisms can be used to supply the compressed air required for the purpose of delivering tacks in the manner described, we prefer to use some form of apparatus which, like that just described, will produce each charge of compressed air just before it is required to force a tack through the tack conveying duct rather than to use air taken from a large reservoir or supply previously provided. By thus discharging the air immediately after it is compressed, and while it is at substantially the temperature to which it has been raised by the act of compression,—that is, while it is under adiabatic compression,— we avoid the condensation of moisture on the walls of the ducts through which the air is delivered that is liable to take place when a supply of the latter kind is used, and which is objectionable because of the liability of the moisture to corrode the parts of the machine and to interfere with the proper delivery of the tacks.

Figure 2:
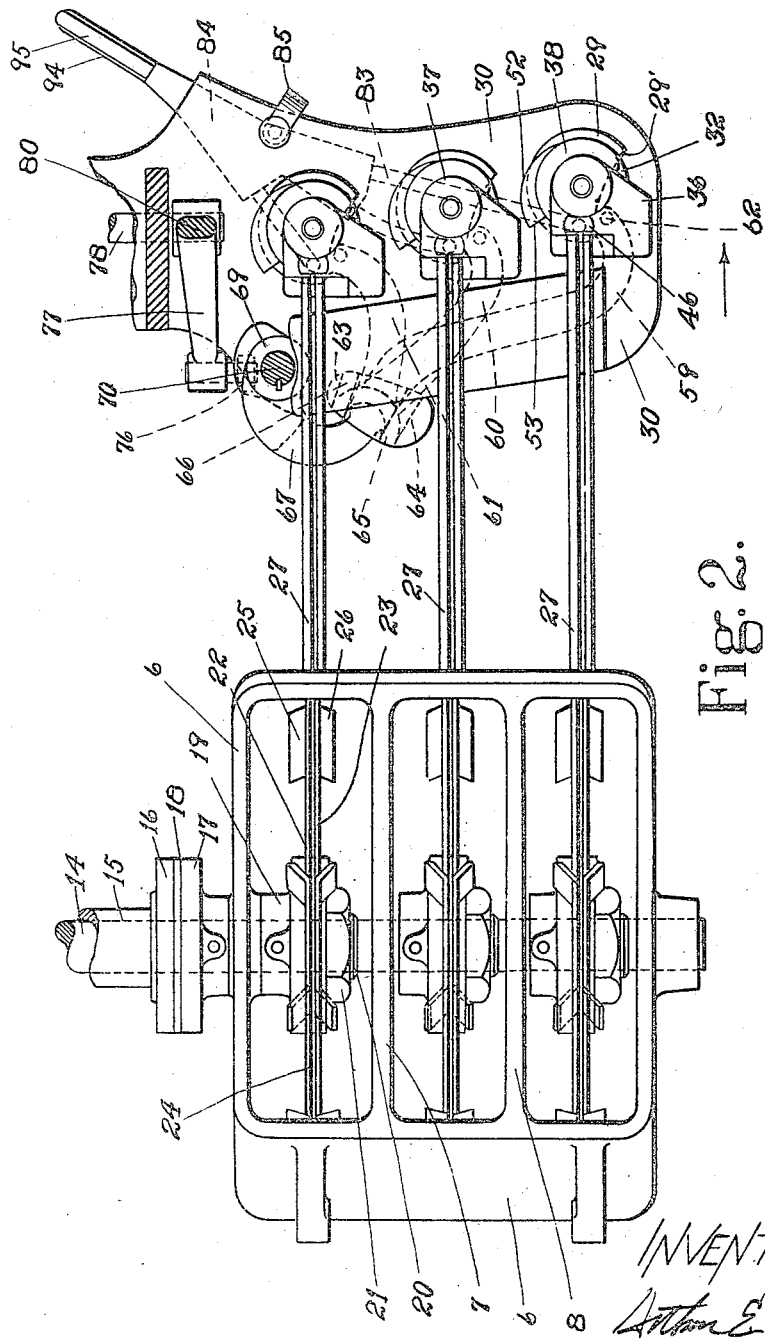
Fig. 2 is a plan, with certain parts removed.
Figure 3:
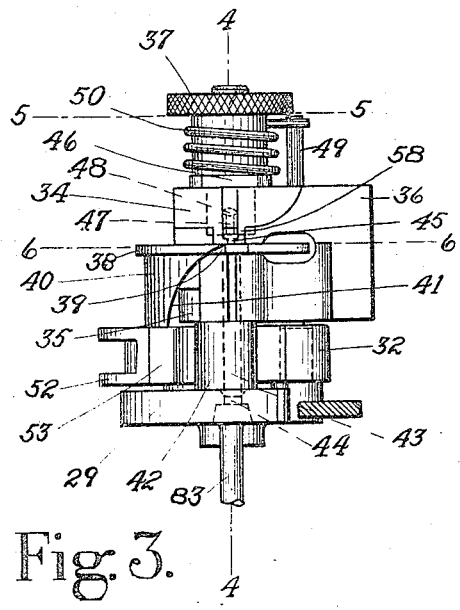
Fig. 3 is a rear elevation of one of the separators looking in the direction of the arrow in Fig. 2.
Figure 4:
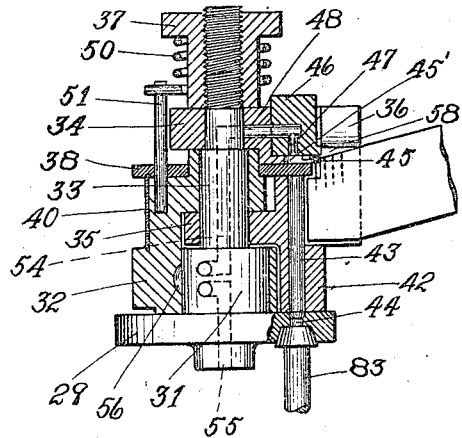
Fig. 4 is a side sectional elevation of the separator on the line 4—4 of Fig. 3, the extremity of the raceway being also shown.
Figure 5:
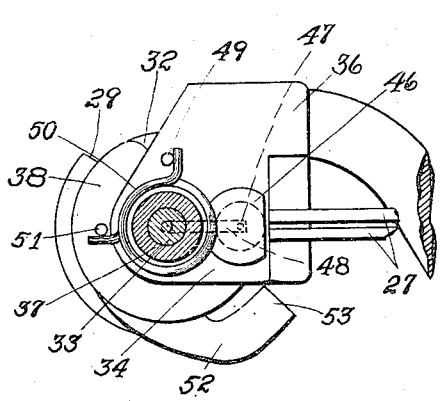
Fig. 5 is a plan, partly in section, on the line 5—5 of Fig. 3.
Figure 6:
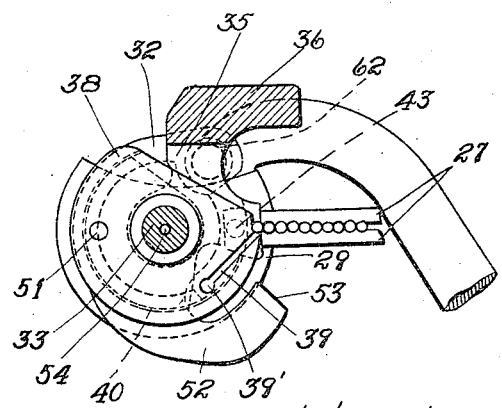
Fig. 6 is a view similar to Fig. 5 but sectioned on the line 6—6 of Fig. 3.

A single mechanism is employed to operate all the separators, this mechanism being arranged for adjustment relatively to the separators to enable it to operate any one of them without operating the others. For this purpose the separators are provided with levers 59, 60 and 61, respectively, each lever being connected to the movable block 32 of its respective separtor by a pivot pin 62 (see Fig. 1). The separators are disposed at slightly different levels, as shown in Fig. 1, so that the free ends of the levers 59, 60 and 61 may be brought into alinement with each other one above the other. The three free ends of these levers are positioned between two walls 63 and 64 formed in the separator bracket 30, the lower lever 61 resting upon the bracket and the upper lever 59 lying just under two overhanging ribs 65 and 66 (Fig. 2) which coöperate with the bracket 30 to prevent the ends of the levers from being displaced vertically. These lever ends are shaped, as indicated in Fig. 2, to adapt them for engagement, one at a time, with the ends of either of two arms 67 and 68 projecting from a sleeve 69 which constitutes the operating device for the levers, and consequently for the separators. These levers normally are held in position to be engaged by one of the arms 67 or 68 by means of a spring 50 with which each separator is equipped, and which acts upon two pins 49 and 51 projecting, respectively, from the bracket 36 and the separator block 32, to hold the separator block normally at the backward limit of its stroke, as shown substantially in Fig. 6.

The operating mechanism for the separators includes, in addition to the sleeve 69, a shaft 70 on which the sleeve is keyed so that it can slide axially of the shaft but is forced to oscillate therewith, and an arm 71, pinned to the upper end of the shaft 70 (see Fig. 1) and bearing a cam roll 72 that normally is held in contact with a cam 73 by means of a spring 74 that encircles and acts through the shaft 70. The cam 73 is driven from the main shaft of the machine. The spring 74 permits the roll 72 to be held out of contact with the cam by a wedge or cam (not shown) which is operated from the mechanism that brings into action the auxiliary wipers which are used in these machines when wiring the toe portion of a welt shoe; and accordingly it permits the interruption of the tack supply at this time.

The cam 73 is rotated once in each cycle of operations of the machine and is so formed as to move the separator, which it actuates in a given cycle, far enough to complete the tack separating operation in approximately the first twelfth of the revolution of the main shaft, thus giving ample time for the transfer from the separator to the driver of the tack so separated before the driver descends in a later stage of the same cycle. The separator, of course, can make its return movement at any convenient time after it has separated a tack. In order to limit the range of movement of the separator block 32, this block is provided with a tail piece 52, and the end 53 of this piece is arranged to strike a fixed stop (not shown) at the end of the separating movement.

When any one of the separators is operated by the engagement of one of the arms 67 or 68 with the end of one of the levers 59, 60 or 61, the separator so actuated delivers a tack to its tack conveying duct 43 and operates, as above described, to admit compressed air through the ducts 55, 54 and 48 to a point above the head of the tack where the blast of air impels the tack through the duct 43 and into one of the ducts 83 that leads from each of the separators. These three ducts lead into, or unite to form, a common duct 95 through which the tack is impelled by the blast of air, and which directs the tack into the tack block 5. As shown in Fig. 11, the ends of the three pipes or ducts 83 remote from their respective separators are inserted in a plate 84 which is detachably secured to a part of the bracket 30 by means of a clamp 85. Ducts 86, 87 and 88 in the plate 4 form continuations, respectively, of the three ducts 83 and at the junction of each pair of ducts a member 90 is mounted to swing about a pivot 91 so that it can open or close either duct. A blast of air through one of the ducts 83 swings the member 90, which closes that duct, into an open position and thus clears the path for the tack which the blast of air carries with it. At the same time it closes the other ducts and thus confines the action of the air to the tack that is being delivered.

The short duct or pipe 95, into which the other ducts lead, is mounted upon a block 94 that is supported on a pivot pin 92 extending through a lug depending from the plate 84. A spring 97 acts on this block to hold it normally against a stop 96 but permits the block to swing sufficiently to move the duct or nozzle 95 out of the way of the tack block 5. This pivotal mounting, in conjunction with the angular position of the nozzle 95 with reference to the path of movement of the tack block, permits the nozzle to yield in case a tack lodges between the end of the nozzle and the tack block.

It should be noted that the various ducts are readily accessible so that any accidental lodgment of the tack can be easily dealt with. Thus, withdrawal of the plug 46 affords access to the openings 45′, 39′ and the duct 43, and by loosening the clamp 85, the support 84 can be removed from the bracket 30, carrying the ducts 83 and the nozzle 95 with it and allowing these ducts to be inspected or probed.

As above stated, the tack separating mechanism is controlled by a selecting means that is operative to determine which separator shall be operated during any given cycle and which, consequently, determines the kind of tack that shall be delivered to the driving mechanism in any given cycle. This mechanism comprises a bell crank lever 80, mounted on a shaft 78 (see Figs. 1 and 2), one arm 77 of which carries a roll 76 that is positioned in a slot 75 formed in the sleeve 69, while the other arm 79 lies beside an arc shaped plate 81 having a series of perforations formed in it. A pair of pins 82 and 82′ is provided for insertion into any selected pair of holes in the plate 81 for the purpose of determining the position of, or limiting the range of movement of the bell crank lever, and consequently of the sleeve 69 that carries the separator operating arms 67 and 68. In other words, the adjustment of the arm 79 of the bell crank lever 80 backward and forward with reference to the plate 81 raises or lowers the sleeve 69 and consequently brings the arms 67 or 68 into engagement with one or another of the levers 59, 60 and 61, or else moves these arms entirely out of operative relationship to said levers.

The holes are so spaced on the plate 81 that if the end 79 is between the first and second holes from the left as viewed in Fig. 1, the sleeve 69 will have been brought so low that both the arms 67 and 68 will be below the ends of the levers 59, 60, 61 and oscillation of the arms by the cam 73 will be ineffective to produce tack separation. With the end 79 between the second and third holes the arm 67 will engage the end of the lever 61 and the corresponding separator will be actuated. With the end 79 between the third and fourth holes the arm 67 will engage the lever 60; while in the position shown in Fig. 1 the arm 67 is in engagement with the lever 59. On moving the end 79 to the next position on the right the arm 67 passes out of engagement with the levers 59, 60, 61 and the arm 68 takes its place, the latter engaging first the lever 61 and in the next position the lever 60. In this manner a wide range of conditions can be met.

It is obvious that the selector lever 80 can be adjusted by hand but it is often desirable to effect this adjustment automatically in accordance with the portion of the work that is being operated upon. For this purpose the shaft 78 is connected to the bunter 3 (Fig. 1) in such a manner that when the latter is retracted, for example when working on the shank portion of a boot or shoe, the shaft is rocked in one direction and when the bunter is advanced, for example when working on the heel or toe portion of the boot or shoe, the shaft is rocked in an opposite direction. There is a frictional connection between the bunter and the shaft 78 which insures that if the pins 82, 82$^1$, are placed as shown in Fig. 1 or if they are placed only so far apart that the permitted throw of the arm 79 of the lever 80 is less than that corresponding to the movements of the shaft 78, no damage to the parts will occur. That is, the shaft 78 has mounted upon it an arm 115 (see Figs. 13, 14, 17 and 18) which is connected to the shaft for rotation therewith by friction coupling comprising a collar 116 (see Fig. 13) pinned to the shaft, a washer 117 of leather or other suitable material between the collar and the arm 115, and a spring 118 between the arm 115 and a bearing 119 on the frame of the machine. The arm 115 at its lower portion supports the bunter 3 in a block 121 having a guideway and clamping screw 122 (see Figs. 13 and 14).

It will now be understood that by placing the pins in the proper holes in the plate 81 the tack supply can be entirely cut off no matter what the position of the bunter, or the tack supply can be confined to the kind supplied by any one of the separators. By spacing the pins suitably apart the bunter can be caused in its movement forward or backward to throw the end 79 into different positions giving various combinations of tack supply. For instance in the machine illustrated in order to render it capable of supplying tacks suitable for either McKay or welted work the separator operated by the lever 59 could be supplied with long McKay tacks, the separator operated by the lever 61 with short McKay tacks and the separator operated by the lever 60 with welt tacks. On setting the pin 82 into the second hole from the right of the plate 81 (Fig. 1) the mechanism would be adjusted to deliver long McKay tacks with the bunter forward as shown in Fig. 1 (that is, when working on the heel and toe portions of McKay shoes) and short McKay tacks suitable for the shank portions of the work with the bunter back, the arm 68 then coming into engagement with the lever 61. To change to welted work it would be only necessary to put the pin 82 into the last hole to the right. With the bunter forward long McKay tacks suitable for the heels of the welted work would then be delivered; with the bunter back welt tacks for working in the shank and ball would be delivered, while the throwing into action of the auxiliary wipers when wiring at the toe would, as above described, effect the desired cessation of tack supply.

The arm 115 is also connected by a pivot 123 (see Fig. 14) to a rod 124 which passes through a sleeve 125 pivotally connected to a crank pin 126 on a crank disk 127 fast upon a shaft 128. The rod 124 has a collar 129 pinned to it at one end to limit its movement and also has formed in it a notch adapted to be engaged by a spring pressed pawl 130 pivoted at 131 upon the sleeve 125. The rear portion of the feather gage 4 is supported by a leaf spring 132 (see Fig. 14) which is fixed to the machine frame, said gage being connected by adjusting screws 133, 133$^1$ to a rod 134 passing into a sleeve 135 formed in an eccentric strap 136 that encircles an eccentric 137 upon the disk 127. The rod 134 is notched similarly to the rod 124 to be engaged by a spring pressed pawl 138 carried on the sleeve 135. The pawls 130 and 138 allow movements of the bunter and feather gage to be effected by hand, when desired, independently of their operating shaft 128, so that whichever of them (the bunter or the feather gage) happens at the time to be in operative position may be moved back to allow free access to the tack block and ducts over these parts in case of stoppage or clogging of the tacks. Of course both the bunter and the feather gage may be moved back if desired.

The shaft 128 is connected to mechanism which acts automatically, upon depression of a lever 139, see Fig. 13, having a face 140 within convenient reach of the operator's hand or the work, so that he can depress the lever 139 by contact with the face 140 of the boot or shoe which he is holding, to retract the bunter and advance the feather gage or vice versa; and by motion of the arm 115 to effect change of tack supply and, in certain circumstances, change of driver stroke. This automatic mechanism will now be described.

The lever 139 is pivoted upon a shaft 140$^1$ held in a portion 141 of the machine frame (see Fig. 15). The end of the lever remote from the face 140 carries a stop 142 (see Fig. 15) adapted to engage one or the other of two notches formed in a cam disk 143 pinned to the shaft 128. In order to urge the stop 142 normally into contact with the disk 143 a spring 144 is placed between a shoulder 145

(see Figs. 13 and 15) upon the lever 139 and a corresponding portion of the frame. A coil spring 146, which forms the driving element for the shaft 128, is connected at one end by a pin 147 to the interior of the cam disk 143 and at its other end by a pin 148 to a disk 149 loose upon the shaft 128. The disk 149 has two notches on its periphery with one or other of which a spring pressed pawl 150 (Fig. 15) mounted upon a pin 151 on the machine frame, is adapted to engage. On the periphery of the disk 149 are also formed two flats 152, 152¹ and a member 153 mounted upon a pivot 154 in the machine frame is so positioned that when urged upwardly by a spring 155 a tail 156 on it projects into the path of the periphery of the disk 149 when the latter is rotated on the shaft 128, the member 153 having also formed upon it a projection 157 positioned and adapted to enter one or other of the notches on periphery of the disk 143 which are engaged by the stop 142. The disk member 149 also carries, in a hollowed internal portion, a pawl 158 urged by a spring 159 into contact with a disk member 160 having two peripheral notches with one or the other of which the pawl 158 can enter into engagement. The disk member 160 is also loose upon the shaft 128 and is formed on one end of a sleeve 161 having a toothed end portion 162 meshing with a toothed segment 163 freely held upon a shaft 164 that is supported in a bearing 165 in the machine frame and is oscillated once in every cycle of operations of the machine by cam or other connections with the main shaft of the machine. Pinned to the shaft 164 is a collar 166 having a depending portion 167 formed with a shoulder 168 adapted to bear upon the segment 163 in one direction of motion of the shaft 164 and a shoulder 169 adapted on motion of the shaft in the opposite direction to be capable of engaging one end of a pawl 170 mounted upon a pivot 171 upon the segment 163. The pawl 170 can be held out of the path of the shoulder 169 against the influence of a spring 172 by the engagement of its other end with an arm of a member 173 mounted upon a pivot 174 on the machine frame, another arm of which member is, under the influence of a spring 175, held in contact with one end of a rod 176 slidably held in the machine frame. The other end of the rod 176 bears upon an edge cam surface formed upon the disk member 143.

The mode of operation of the parts just described is as follows: As soon as the lever 139 is moved to release the stop 142 from engagement with a notch in the disk 143, the spring 146 acts to rotate the disk and with it the shaft 128 on which the disk is fastened, thus operating through the eccentric mechanism above described to retract the bunter 3 and advance the feather gage 4, or vice versa. The projection 157 on the pawl 156 prevents the disk 143 from making more than a half revolution each time that the lever 139 is depressed. It will be noted from an inspection of Fig. 15 that the projection 157 is located slightly less than 180 degrees in advance of the end of the stop 142 so that, when this stop is in engagement with one of the notches on the disk 143, the projection 157 is out of engagement with the opposite notch. Consequently, when the disk 143 is rotated in a counter-clockwise direction, as the parts are seen in Fig. 15, the notch previously engaged by the stop 142 will strike the projection 157 when the disk has made nearly a half revolution and the other notch will then lie just in front of the stop 142. When the disk 149 is rotated an instant later to wind up the spring 146, one of the projections between the faces 152 and 152′ will depress the pawl 156 and release the disk 143 from the control of the projection 157; but it will make only a very slight rotative movement before coming in contact with the stop 142.

The winding up of the spring 146 after its tension has been relaxed by rotation of the disk 143 is effected in the following manner from the shaft 164. Any rotation of the disk 143 causes the edge cam thereon to move the rod 176 endwise, thus swinging the member 173 so as to withdraw its arm from behind the pawl 170 and allow the latter under the influence of its spring 172 to engage the shoulder 169, so that on the next counter-clockwise movement of the shoulder 169, as shown in Fig. 13, by the shaft 164 the segment 163 will be moved with the shaft. This movement rotates the sleeve 161 in a counter-clockwise direction, as the parts are seen in Fig. 15, and this rotation is transmitted by the pawl 158 to the disk 149, thus winding up the spring 146. The pawl 150 prevents any return movement of the disk 149.

The return movement of the shaft 164 returns the segment 163 to starting position by the contact of the shoulder 168 with the segment, the member 173 having meanwhile returned to its initial position behind the pawl 170 and withdrawn the latter from engagement with the shoulder 169. The pawl 158 allows the disk 160 to be rotated in a clockwise direction during the return movement of the shaft 164.

The arm 115 has a guideway 120 (Figs. 17 and 18) formed in it which acts to effect a change of driver stroke with certain changes of tack supply in the following manner. The driver bar 177 sliding in a bearing 178 on the frame of the machine is connected in the usual way to an operating arm 179 urged downwardly by a strong spring 180 and raised by a cam 181 operated from the main shaft of the machine. Loose upon the driver bar is a plate 182 having a castellated lower portion with inclined surfaces 183 upon the castellations. This plate rests upon a similarly formed upper portion on the bracket 178 and forms a stop which is engaged by the head 184 on the driver bar and limits the down stroke of the driver. It will be seen that a turning movement imparted to the plate 182 will, by the engagement of the faces 183 with the corresponding faces on the bracket 178, raise the plate and thus reduce the driver stroke as is needed when driving welt tacks so that they may be driven only partly into the work. This turning movement is imparted, when desired, to the plate 182 by connections to the guideway 120 on the member 115.

Supported in bearings 185, 185¹ on the bracket 178 is a shaft 186 having at its upper end a crank arm 187 and a crank pin 188 entering a recess in the plate 182. At its lower end the shaft has pinned to it an arm 189 (Fig. 19) having a cylindrical passage 190 formed in it. Mounted to swing freely upon the lower end of the shaft and held thereon by a collar 191 is a bell crank lever having an arm 192 positioned in the guideway 120 and an arm 193 in which is formed a chamber 194 for a plunger 195 that is urged by a spring 196 into the opening 190 on the arm 189. The plunger 195 is provided with a milled head 197 to allow the plunger to be withdrawn and it also carries a pin 199 which upon retraction of the plunger and partial rotation thereof comes out of the slot 198 and bears upon the lower edge of the arm 193 where it holds the plunger down. When lasting McKay work the arm 192 is held disconnected in this way from the driver stroke adjusting means so that a change in the bunter position does not affect the driver stroke but where welted work is being lasted the arms 189 and 192 are connected so that retraction of the bunter will shorten the driver stroke and the welt tacks will be driven only partly home.

The operation of the machine has been described so completely in connection with the description of the various mechanisms that any further statement concerning the operation is believed to be unnecessary.

It is obvious that since the tack separating action is effected in approximately the first twelfth of the revolution of the main driving shaft of the machine any change in the adjustment of the selecting mechanism ordinarily does not effect a change in the tack supply until the next cycle succeeding the one in which such a change in adjustment is made; but of course if the change in the adjustment of the selecting mechanism was made while the machine was stopped it would effect a corresponding change in the delivery and driving of fastenings in the first cycle of operations of the machine.

While the invention has been above described as embodied in a machine for lasting shoes, it is obvious that it is not limited in application to machines of this class. It will also be understood that the invention is not limited to the conjoint use of all its features and that it is susceptible of embodiment in a large variety of specific forms without departing from its spirit or scope.

Having thus described our invention, what we claim as new and desire to secure by Letters Patent of the United States is:

1. In a fastening inserting machine, the combination with means for driving fastenings into the work, of a plurality of fastening separators, means for supplying fastenings to said separators, and selecting means operative to cause one separator only to be effective during a given cycle of operations of the machine, said driving and selecting means and said fastening separators being timed to cause the machine to separate a fastening from a supply and drive the fastening so separated into the work during a single cycle of operations.

2. In a fastening inserting machine, the combination with means for driving fastenings into the work, of means for supplying a plurality of kinds of fastenings to said driving means including selecting and separating mechanisms operative to determine the number and kind of fastening to be delivered to the driving mechanism at each cycle of operations of the machine, means operative to engage the work while the machine is operating on it, and connections between said work engaging means and said supplying means constructed and arranged to cause predetermined changes in the position of said work engaging means to effect a change in the delivery of fastenings to said driving means, said connections and driving and supplying means being constructed and arranged to effect said change in fastening delivery in the cycle of operations of the machine next succeeding that in which the change in the position of said work engaging means is made.

3. In a fastening inserting machine, the combination with means for driving fastenings into the work, of means for supplying a plurality of kinds of fastenings to said driving means including selecting means and separating mechanisms operative to determine the number and kind of fastenings to be delivered to the driving mechanism at each cycle of operations of the machine, said driving and supplying means being constructed and arranged to cause the machine to drive in each cycle of operations of the machine the fastenings separated during that cycle and said supplying means being adjustable at the will of the workman to effect a change in the delivery of fastenings to said driving mechanism.

4. In a fastening inserting machine, the combination with means for driving fastenings into the work, of a plurality of fastening separators, means for supplying fastenings of different kinds to said separators, selecting means operative to cause one separator only to be effective during a given cycle of operations of the machine, said driving, selecting and separating means being timed to cause the machine to separate a fastening from a supply and drive the fastening so separated into the work during a single cycle of operations, means constructed and arranged to bear on the work into which the fastenings are being inserted, and connections between said work engaging means and said supplying means whereby a predetermined change in the position of said work engaging means is operative through said connections to change the kind of fastening delivered to said driving means.

5. In a fastening inserting machine, the combination with means for driving fastenings into the work, of a plurality of fastening separators, means for supplying fastenings to said separators, a single operating mechanism for all of said separators arranged to be connected to and disconnected from said separators, and adjustable selecting means constructed and arranged to control the operation of said separators.

6. In a fastening inserting machine, the combination with means for driving fastenings into the work, of a plurality of fastening separators, means for supplying fastenings to said separators, a single operating mechanism for all of said separators arranged to be connected to and disconnected from said separators, and adjustable means controlled by the work for determining which of said separators shall be operative during any cycle of operations of the machine.

7. In a fastening inserting machine, the combination of a plurality of stationary raceways, means for supplying fastenings to said raceways, a plurality of fastening separating means to which the fastenings are delivered by said raceways, a tack block to which tacks are delivered by the separating means; and selecting means adjacent to the tack block shiftable at the will of the workman by contact with the work and operative to determine which of said separating means shall be effective to discharge fastenings to the tack block.

8. In a fastening inserting machine, the combination of fastening separating means, mechanism for supplying fastenings of different kinds to said means, controlling mechanism for said separating means operative to cause said means to select fastenings of a predetermined kind or to stop the delivery of fastenings, means for driving the fastenings into the work, and fastening conveying means constructed and arranged to utilize compressed air to deliver fastenings from said separating means to said driving means, said driving, separating and conveying means being constructed and arranged to cause the machine to separate a fastening from a supply and drive the fastening so separated into the work during a single cycle of operations.

9. In a fastening inserting machine, the combination with means for driving fastenings into the work, of a plurality of fastening separators, means for supplying fastenings of different kinds, respectively, to said separators, selecting means arranged to control the operation of said separators, and fastening conveying means constructed and arranged to utilize compressed air to deliver the fastenings from said separators to said driving means.

10. In a fastening inserting machine, the combination with means for driving fastenings into the work, of a plurality of fastening separators, means for supplying fastenings of different kinds, respectively, to said separators, selecting means arranged to control the operation of said separators, fastening conveying means constructed and arranged to utilize compressed air to deliver the fastenings from said separators to said driving means, and means arranged to render said conveying mechanism operative in any cycle in connection only with the separator which is effective in that cycle.

11. In a fastening inserting machine, the combination with means for driving fastenings into the work, of a plurality of fastening separators, means for supplying fastenings of different kinds, respectively, to said separators, selecting means arranged to control the operation of said separators, fastening conveying ducts leading from said separators to said driving means, and means for supplying compressed air to said ducts to impel therethrough the fastenings delivered to them by the separators, said separators being constructed and arranged to control the delivery of compressed air to said ducts.

12. In a fastening inserting machine, the combination with means for driving fastenings into the work, of means for supplying different kinds of fastenings to said driving means including selecting and separating mechanisms operative to determine the number and kinds of fastenings to be delivered to the driving mechanism in each cycle of operations of the machine, said selecting mechanism including a movable controlling device therefor, and adjustable means for limiting the movements of said device.

13. In a fastening inserting machine, the combination with means for driving fastenings into the work, of means for supplying different kinds of fastenings to said driving means including selecting and separating mechanisms operative to determine the number and kinds of fastenings to be delivered to the driving mechanism in each cycle of operations of the machine, said selecting mechanism including a movable controlling device therefor, adjustable means for limiting the movements of said device, a member operative to engage the work, and means connecting said device with said member whereby said member is enabled to move said device to effect a change in the supply of fastenings delivered by said supplying mechanism.

14. In a fastening inserting machine, the combination with means for driving fastenings into the work, of means for supplying different kinds of fastenings to said driving means including selecting and separating mechanisms operative to determine the number and kinds of fastenings to be delivered to the driving mechanism in each cycle of operations of the machine, said selecting mechanism including a movable controlling device therefor, adjustable means for limiting the movements of said device, a member operative to engage the work, and yielding connecting means between said device and said member whereby said member is enabled to move said device to effect a change in the supply of fastenings delivered by said supplying mechanism.

15. In a fastening inserting machine, the combination with means for driving fastenings into the work, of means for supplying different kinds of fastenings to said driving means including selecting and separating mechanisms operative to determine the number and kinds of fastenings to be delivered to the driving mechanism in each cycle of operations of the machine, said selecting mechanism including a movable controlling device therefor, a member movable into different positions of adjustment according to the portion of the work on which the machine is operating, and connections between said member and said device whereby predetermined changes in the position of said member are operative to move said device to effect thereby a change in the supply of fastenings delivered by said supplying means.

16. In a fastening inserting machine, the combination of a plurality of separators each having a member by means of which it is operated, and a driven device engageable with said members to operate said separators, said device and said members being relatively adjustable to render said device effective to operate any one of said separators without operating the others.

17. In a fastening inserting machine, the combination of a plurality of separators each having a member by means of which it is operated, a constantly driven operating device for said separators mounted for adjustment relatively to said members to enable it to operate any one of said separators without operating the others, and means for adjusting said device.

18. In a fastening inserting machine, the combination with a driver, of means for supplying fastenings of different kinds to said driver including separating and selecting mechanism operative to determine the kind and number of fastenings to be delivered to the driver in each cycle of operations of the machine, said selecting mechanism including an adjustable controlling device, and means connected with said device and arranged to be rendered operative or inoperative at will to cause the device to effect a change in the length of the driver stroke upon making a predetermined change in the delivery of fastenings to said driver.

19. In a fastening inserting machine, the combination with a driver, of means for supplying fastenings of different kinds to said driver including separating and selecting mechanism operative to determine the kind and number of fastenings to be delivered to the driver in each cycle of operations of the machine, a bunter arranged to engage the work and operative through said selecting mechanism to effect a change in the supply of fastenings to the driver when a predetermined change is made in the position of the bunter, automatic mechanism for moving said bunter from one position to another, and a member located adjacent to the position occupied by the work while the machine is inserting fastenings therein and connected with said automatic mechanism to control its action.

20. In a fastening inserting machine, the combination with mechanism for driving fastenings into the work and means for supplying fastenings to said driving mechanism, of a bunter operative to engage the work during the fastening inserting operation, connections whereby a predetermined change in the position of said bunter is operative to modify the fastening inserting operation, and automatic mechanism for moving said bunter constructed and arranged to advance and retract the bunter in successive operations.

21. In a fastening inserting machine, the combination with mechanism for driving fastenings into the work and means for supplying fastenings to said driving mechanism, of a bunter operative to engage the work during the fastening inserting operation, connections whereby a predetermined change in the position of said bunter is operative to modify the fastening inserting operation, automatic mechanism for moving said bunter constructed and arranged to advance and retract the bunter in successive operations, and a member located adjacent to the position occupied by the work while the machine is inserting fastenings therein and connected with said automatic mechanism to control its action.

22. In a fastening inserting machine, the combination with a separator, means for delivering fastenings to said separator, and operating mechanism for said separator, of a fastening conveying duct to which the fastenings are delivered by said separator, and air supplying means under control of the separator operative to deliver air to said duct at predetermined times and thereby to impel through said duct the fastenings delivered to it.

23. In a fastening inserting machine, the combination with a separator, means for delivering fastenings to said separator, and operating mechanism for said separator, of a fastening conveying duct to which the fastenings are delivered by said separator, means for supplying air under pressure to a point in said duct behind the point at which the fastenings are delivered to it, and a valve controlled by said separator and arranged to control the delivery of air to said duct.

24. In a fastening inserting machine, the combination with a raceway, means for delivering fastenings to said raceway, a separator mounted for to and fro movement at the delivery end of said raceway, and operating mechanism for said separator, of a fastening conveying duct leading from said separator and into which the separator directs fastenings one at a time from said raceway, and means for delivering compressed air to said duct to impel the separated fastenings therethrough including an air passage lying partly in said separator and constructed and arranged to enable the separator to admit compressed air to the duct only at a predetermined point in its stroke.

25. In a fastening inserting machine, the combination of a separator comprising a fixed member and a movable member having a separator notch formed therein, mechanism for moving said movable member, means for supplying fastenings to said separator, said fixed member having a fastening delivering passage into which said movable member forces the fastenings one at a time and having an air duct opening into said passage, and means for supplying compressed air to said duct, said movable member being constructed and arranged to control the flow of air through said duct.

26. In a fastening inserting machine, the combination of a plurality of separators, means for supplying fastenings to said separators, a fastening conveying duct leading from each separator, a common duct into which the other ducts lead, and means under the control of the individual separators for delivering air under pressure to said ducts to force each separated fastening through the duct to which it is delivered.

27. In a fastening inserting machine, the combination of a plurality of fastening conveying ducts, means for delivering fastenings to said ducts, a common duct into which the other ducts lead, means for forcing air through said ducts at predetermined times to impel therethrough the fastenings delivered to them, and means located at the junction points of the ducts and operative automatically to open the path for the delivery of fastenings from any of said ducts and to close the ducts through which fastening are not being delivered.

28. In a fastening inserting machine, the combination of a plurality of fastening conveying ducts, means for delivering fastenings to said ducts, a common duct into which the other ducts lead, and means for forcing air under adiabatic compression through said ducts at predetermined times to impel therethrough the fastenings delivered to them.

29. In a fastening inserting machine, a pair of fastening conveying ducts, means for delivering fastenings to said ducts, a common duct into which the other ducts lead, means for forcing air through said ducts at predetermined times to impel therethrough the fastenings delivered to them, and a pivoted member positioned at the junction of said ducts and arranged to be moved by the flow of air through either duct to open the path therethrough for the passage of fastenings and simultaneously to close the other duct.

30. In a fastening inserting machine, the combination with a fastening conveying duct and means for delivering fastenings to said duct in a predetermined manner, of an air compressor, connections for delivering air from said compressor to said duct, driving mechanism for said fastening delivering means, and operating means for said compressor operatively connected with said driving mechanism and constructed and arranged to render the air pressure created by said compressor independent of variations in the speed of the machine.

31. In a fastening inserting machine, the combination with a fastening conveying duct and means for delivering fastenings to said duct in a predetermined manner, of an air pump, connections for delivering air from said pump to said duct, driving mechanism for said fastening delivering means, said pump comprising a cylinder and a piston mounted to reciprocate in said cylinder, means operatively connected with said driving mechanism for giving said piston its intake stroke, and a spring operative to give the piston its compression stroke.

32. In a fastening inserting machine, the combination with a fastening conveying duct and means for delivering fastenings to said duct in a predetermined manner, of an air pump, connections for delivering air from said pump to said duct, driving mechanism for said fastening delivering means, said pump comprising a cylinder and a piston mounted to reciprocate in said cylinder, a piston stem projecting from said piston, a plurality of cams operatively connected with said driving mechanism and arranged to operate in succession on said stem to give the piston its intake stroke, and a spring operative to give said piston its compression stroke.

33. In a fastening inserting machine, the combination with means for driving fastenings into the work, of fastening separating means, mechanism for supplying fastenings of different kinds to said separating means, fastening conveying means constructed and arranged to utilize compressed air to deliver the fastenings from said separating means to said driving means, and mechanism operative to control the kind of fastenings delivered by said separting means to said conveying means.

34. In a fastening inserting machine, the combination with a fastening separating mechanism and a duct for conveying fastenings separated by said mechanism to a point remote therefrom, of an air compressor, connections for delivering air from said compressor to said duct to force the fastenings therethrough, and operating mechanism for said compressor constructed and arranged to produce each individual charge of compressed air immediately before it is required to force a fastening through said duct.

35. In a fastening inserting machine, the combination with a fastening separating mechanism and a duct for conveying fastenings separated by said mechanism to a point remote therefrom; of an air compressor, operating mechanism for said compressor, and connections for delivering air from said compressor to said duct, said machine including means to insure that the fastenings are forced by the air through the duct under temperature conditions such that objectionable condensation of moisture in the duct is avoided.

36. In a fastening inserting machine, the combination with a driver and means for supplying fastenings to said driver, of a device operative to engage the work during the fastening inserting operation, and means connected with said device and arranged to be rendered operative or inoperative at will for causing a predetermined change in the position of said device to effect a change in the stroke of said driver.

37. In a fastening inserting machine, the combination with mechanism for driving fastenings into the work and means for supplying fastenings to said driving mechanism, of a device operative to engage the work during the fastening inserting operation, connections for causing a predetermined change in the position of said device to modify the fastening inserting operation, and mechanism constructed and arranged to advance said device yieldingly into engagement with the work and operative also to retract said device.

38. In a fastening inserting machine, the combination with means for driving fastenings into the work and means for supplying fastenings to said driving mechanism, of a device operative to engage the work during the fastening inserting operation, connections for causing a predetermined change in the position of said device to modify the fastening inserting operation and automatic mechanism for effecting said change in the position of said device.

In testimony whereof we have signed our names to this specification.

ARTHUR ERNEST JERRAM.
FRANK BYCROFT KEALL.

Copies of this patent may be obtained for five cents each, by addressing the "Commissioner of Patents, Washington, D. C."